United States Patent
Van Wynsberghe et al.

[11] Patent Number: 6,012,737
[45] Date of Patent: Jan. 11, 2000

[54] VEHICLE OCCUPANT PROTECTION APPARATUS

[75] Inventors: Roy D. Van Wynsberghe, Mesa; John P. O'Loughlin, Gilbert, both of Ariz.

[73] Assignee: TRW Inc., Lyndhurst, Ohio

[21] Appl. No.: 08/965,511

[22] Filed: Nov. 6, 1997

[51] Int. Cl.[7] .................................................. B60R 21/26
[52] U.S. Cl. ............................................ 280/737; 280/741
[58] Field of Search .................................. 280/741, 736, 280/737; 102/530, 531

[56] References Cited

U.S. PATENT DOCUMENTS

| | | |
|---|---|---|
| 3,674,059 | 7/1972 | Stephenson .............................. 280/737 |
| 4,593,622 | 6/1986 | Fibranz ................................... 102/530 |
| 5,046,429 | 9/1991 | Swann et al. . |
| 5,308,588 | 5/1994 | Emery et al. . |
| 5,470,104 | 11/1995 | Smith et al. . |
| 5,492,365 | 2/1996 | Bayley et al. . |
| 5,533,754 | 7/1996 | Riley . |
| 5,558,366 | 9/1996 | Fogle, Jr. et al. . |
| 5,584,504 | 12/1996 | Cuevas et al. . |
| 5,605,349 | 2/1997 | Childree . |
| 5,613,703 | 3/1997 | Fischer . |
| 5,673,933 | 10/1997 | Miller et al. ............................. 280/736 |

*Primary Examiner*—Paul N. Dickson
*Attorney, Agent, or Firm*—Tarolli, Sundheim, Covell, Tummino & Szabo L.L.P.

[57] ABSTRACT

An apparatus (16) includes a canister (72) defining a hermetically sealed combustion chamber (73). The combustion chamber (73) contains a source of inflation fluid in the form of a body (27) of ignitable gas generating material. The canister (72) has a cylindrical configuration with a longitudinal central axis (79) and first and second opposite end walls (76) and (78). The end walls (76) and (78) have predetermined rupturable portions (82) and (90) extending across the axis (79). An initiator assembly (28) is located outside the canister (72). When the initiator assembly (28) is actuated, it ruptures the rupturable portion (82) of the first end wall (76). It also projects pyrotechnic combustion products into the combustion chamber (73) along the axis (79) to ignite the body (27) of gas generating material in the combustion chamber (73). The rupturable portion (90) of the second end wall (78) is rupturable under a predetermined inflation fluid pressure force acting outward from the combustion chamber (73).

9 Claims, 4 Drawing Sheets

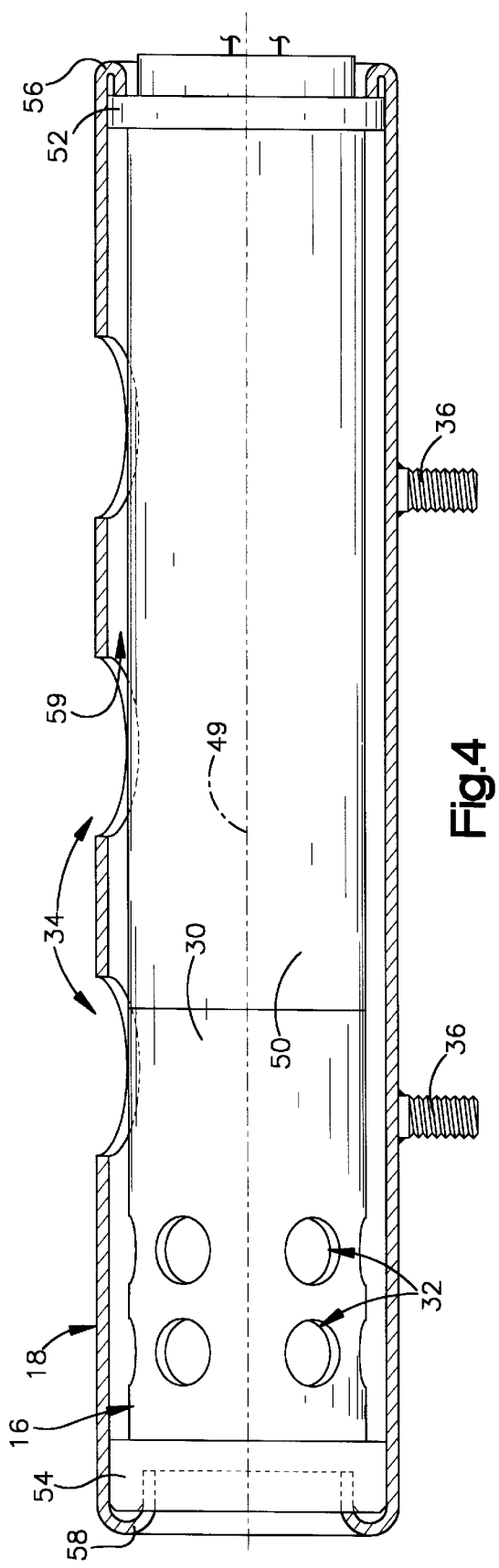
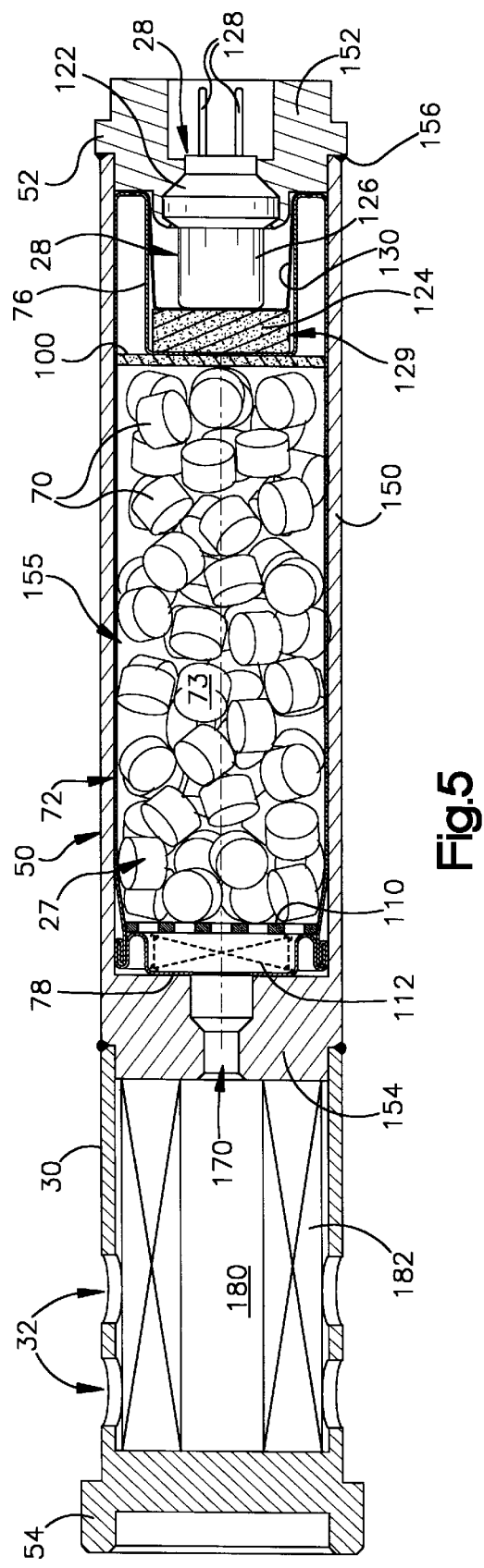

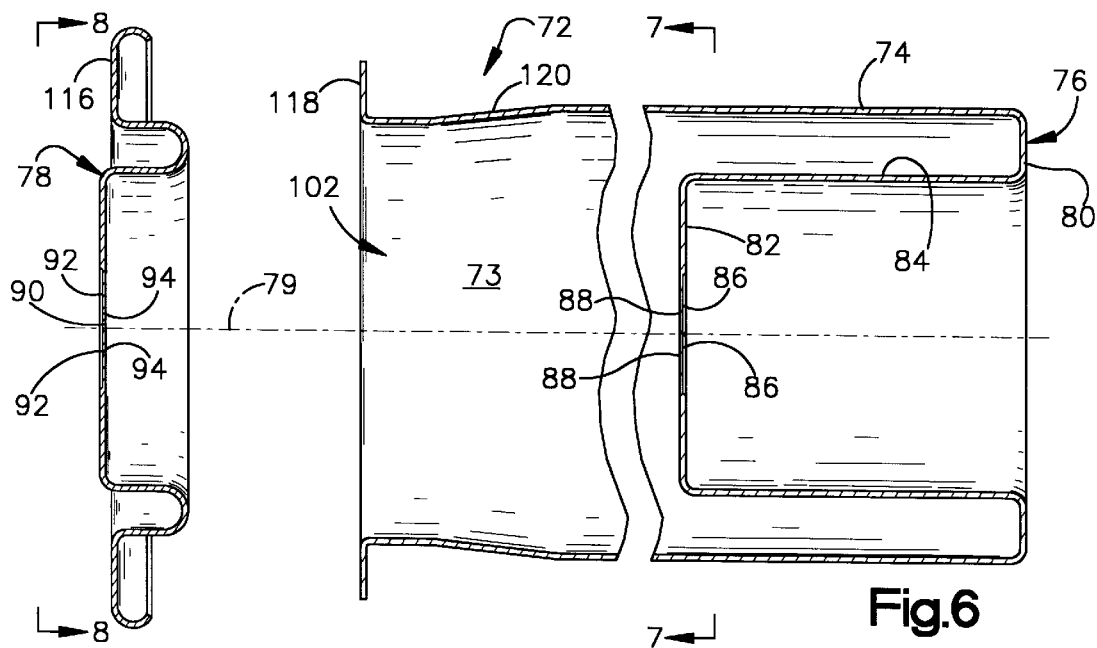
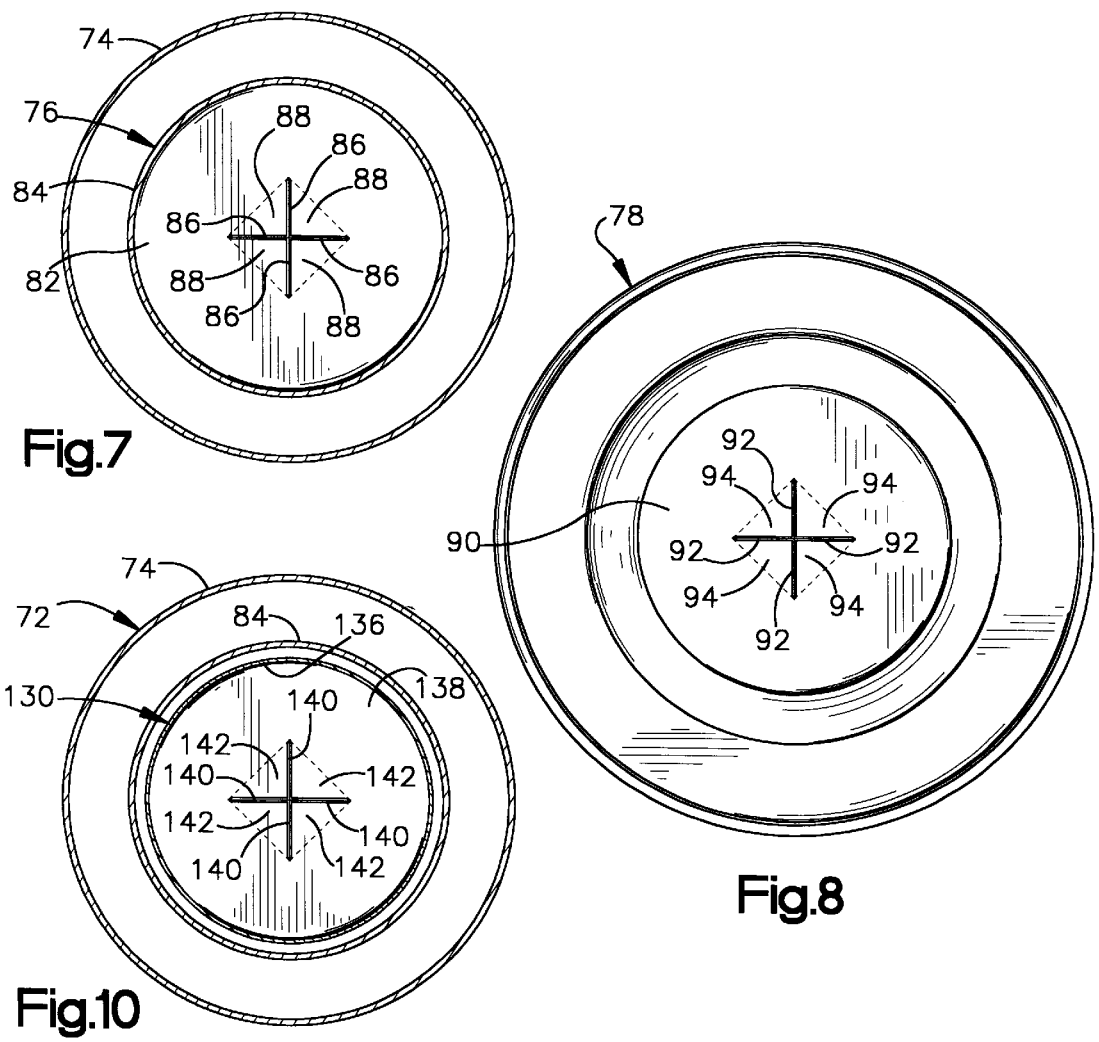
Fig.6
Fig.7
Fig.8
Fig.10

VEHICLE OCCUPANT PROTECTION APPARATUS

FIELD OF THE INVENTION

The present invention relates to an inflator for an inflatable vehicle occupant protection device, and particularly relates to an inflator containing a body of ignitable gas generating material.

BACKGROUND OF THE INVENTION

An inflatable vehicle occupant protection device, such as an air bag, is part of an apparatus which further includes a crash sensor and an inflator. When the crash sensor senses a vehicle crash having at least a predetermined threshold level of severity, the inflator is actuated. The inflator then emits inflation fluid which inflates the air bag into the vehicle occupant compartment to help protect an occupant of the vehicle.

The source of inflation fluid may comprise a body of material which, when ignited, rapidly generates a large volume of inflation gas. Typically, such a body of gas generating material is contained in a cylindrical combustion chamber in the inflator and has a corresponding cylindrical configuration. The body of gas generating material may be defined by a single cylindrical piece of gas generating material or by a stack or row of short cylindrical pieces which are known as grains. The body of gas generating material may alternatively be defined by tablets of gas generating material which fill the combustion chamber. In each case, the combustion chamber is sealed hermetically to protect the body of gas generating material from the ambient atmosphere.

SUMMARY OF THE INVENTION

In accordance with the present invention, an apparatus comprises a canister defining a hermetically sealed combustion chamber. The combustion chamber contains a source of inflation fluid comprising a body of ignitable gas generating material. The canister has a cylindrical configuration with a longitudinal central axis and first and second opposite end walls. Each end wall has a predetermined rupturable portion extending across the axis.

The apparatus further comprises an initiator assembly which is located outside the canister. When the initiator assembly is actuated, it ruptures the rupturable portion of the first end wall of the canister. The initiator assembly then projects pyrotechnic combustion products into the combustion chamber along the axis to ignite the gas generating material in the combustion chamber. The rupturable portion of the second end wall of the canister is rupturable under a predetermined inflation fluid pressure force acting outward from the combustion chamber.

BRIEF DESCRIPTION OF THE DRAWINGS

The foregoing and other features of the present invention will become apparent to one skilled in the art upon consideration of the following description of the invention with reference to the accompanying drawings, wherein:

FIG. 4 is a side view, partly in section, of parts of the apparatus of FIG. 1;

FIG. 5 is a sectional view of parts shown in FIG. 4;

FIG. 6 is an enlarged view of parts shown in FIG. 5;

FIG. 7 is a view taken on line 7—7 of FIG. 6;

FIG. 8 is a view taken on line 8—8 of FIG. 6;

FIG. 10 is a view taken on line 10—10 of FIG. 9.

DESCRIPTION OF A PREFERRED EMBODIMENT

Figure 1:
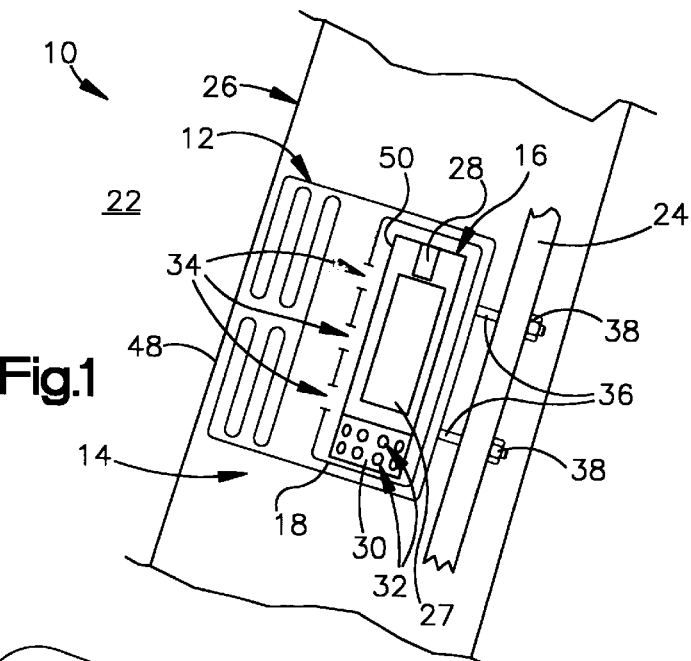
FIG. 1 is a schematic view of a vehicle occupant protection apparatus including an inflator comprising a preferred embodiment of the present invention.
Figure 2:
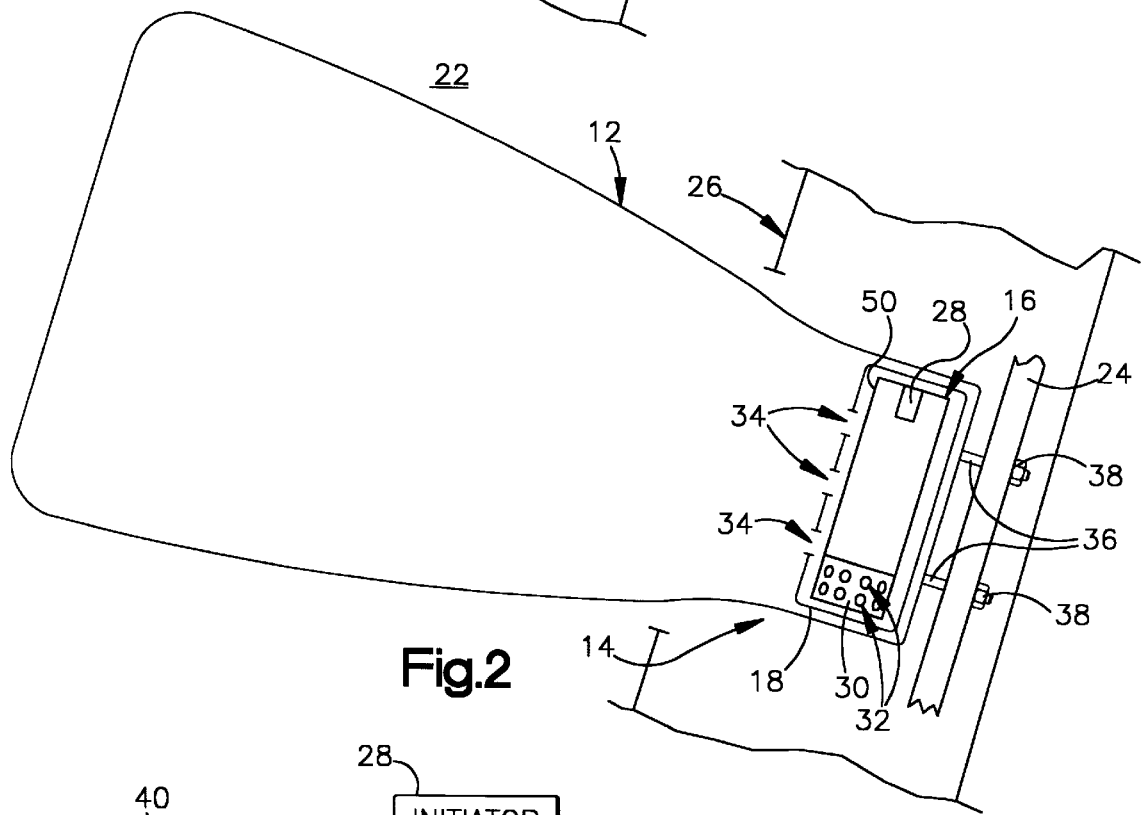
FIG. 2 shows the apparatus of FIG. 1 in an actuated condition.

An apparatus 10 comprising a preferred embodiment of the present invention is shown schematically in FIGS. 1 and 2. The apparatus 10 includes a particular type of inflatable vehicle occupant protection device 12 which is commonly referred to as an air bag. The air bag 12 is inflatable from a folded, uninflated condition, as shown in FIG. 1, to an unfolded, inflated condition, as shown in FIG. 2. Other inflatable vehicle occupant protection devices that can be used in accordance with the present invention included inflatable seat belts, inflatable knee bolsters, inflatable head liners or side curtains, and knee bolsters operated by inflatable air bags.

The air bag 12 is part of an air bag module 14. Other parts of the module 14 include an inflator 16 and a diffuser 18. The inflator 16 and the diffuser 18 are located inside the air bag 12. The module 14 is installed in a vehicle at a location adjacent to the vehicle occupant compartment 22. As shown by way of example in FIGS. 1 and 2, the module 14 is mounted on an upper frame portion 24 of a vehicle seat 26.

The inflator 16 contains a source of inflation fluid for inflating the air bag 12. As described fully below, the source of inflation fluid comprises a body 27 of ignitable gas generating material. The inflator 16 is an elongated cylindrical structure with an initiator assembly 28 at one end and an outlet manifold 30 at the other end. The outlet manifold 30 has a circumferentially extending array of inflation fluid outlet openings 32.

The diffuser 18 is an elongated tubular part which contains the inflator 16. A plurality of larger outlet openings 34 extend through the diffuser 18. A pair of mounting studs 36 project from the diffuser 18. Each mounting stud 36 is threaded, and receives a corresponding nut 38 for fastening the module 14 to the seat frame 24.

Figure 3:
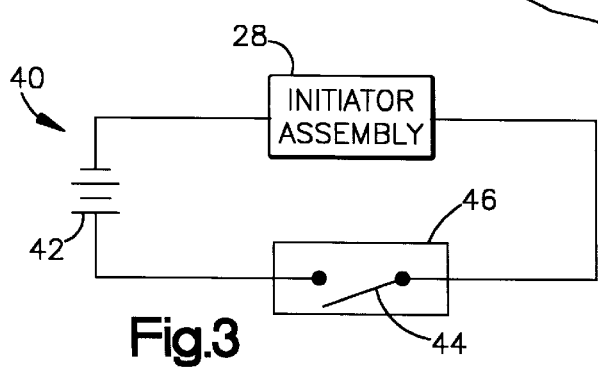
FIG. 3 is a schematic view of an electrical circuit including a part of the apparatus of FIG. 1.

As shown in FIG. 3, the initiator assembly 28 is connected in an electrical circuit 40 with a power source 42 and a normally open switch 44. The power source 42 is preferably the vehicle battery and/or a capacitor. The switch 44 is part of a sensor 46 which senses a condition indicating the occurrence of a vehicle crash. In the preferred embodiment of the present invention, the sensor 46 senses a condition indicating the occurrence of a side-impact vehicle crash. Such a crash-indicating condition may comprise, for example, sudden transverse vehicle acceleration and/or crushing of a side portion of the vehicle. If the crash-indicating condition is at or above a predetermined threshold level, it indicates the occurrence of a crash having a predetermined threshold level of severity. The threshold level of crash severity is a level at which inflation of the air bag 12 is desired to help protect an occupant of the seat 26. The switch 44 then closes and electric current is directed through the initiator assembly 28 to actuate the initiator assembly 28.

When the initiator assembly 28 is actuated, it ignites the body 27 of gas generating material. A large volume of inflation gas is then generated as the body 27 of gas generating material is consumed by combustion. The inflation gas flows rapidly outward from the inflator 16 through the openings 32 in the manifold 30. The openings 34 in the diffuser 18 direct the gas into the air bag 12 to inflate the air bag 12. As the gas begins to inflate the air bag 12, it moves the air bag 12 outward against a cover portion 48 of the seat 26. The force of the gas pressure acting on the air bag 12 ruptures the cover portion 48 of the seat 26. As known in the art, the cover portion 48 of the seat 26 may have a tear seam (not shown) so as to rupture in a predetermined configuration. The module 14 may also include a cover (not shown) for enclosing the air bag 12 and the other parts of the module 14 inside the cover portion 48 of the seat 26. Such a module cover also would be ruptured by the force of the gas pressure acting on the air bag 12. As the gas continues to inflate the air bag 12, it moves the air bag 12 outward from the seat 26 and into the vehicle occupant compartment 22.

As shown in FIGS. 4 and 5, the inflator 16 has a longitudinal central axis 49. A housing portion 50 of the inflator 16 has an elongated cylindrical configuration centered on the axis 49. The manifold 30 also is cylindrical, and projects longitudinally from the housing 50 along the axis 49. The housing 50 and the manifold 30 are rigid metal structures that are preferably formed of low carbon steel or stainless steel. A first annular mounting flange 52 projects radially outward from the housing 50 at one end of the inflator 16. A second mounting annular mounting flange 54 projects radially and axially outward from the manifold 30 at the other end of the inflator 16.

The diffuser 18, which may be referred to as a baffle, also is centered on the axis 49. First and second opposite end portions 56 and 58 of the diffuser 18 are crimped around the first and second mounting flanges 52 and 54 on the inflator 16, respectively. The diffuser 18 is thus mounted on the inflator 16 so as to define an annular gas flow space 59 surrounding the inflator 16 fully along its length between the mounting flanges 52 and 54. The outlet openings 34 in the diffuser 18 are arranged in an axially extending row.

As shown in FIG. 5, the body 27 of gas generating material in the preferred embodiment of the present invention is defined by a plurality of tablets 70. Although the gas generating material may have any suitable composition known in the art, an ammonium nitrate based propellant is preferred. The tablets 70 are contained in an elongated cylindrical canister 72 which, in turn, is contained in the housing 50.

As shown separately in FIG. 6, the canister 72 defines an elongated cylindrical combustion chamber 73 for containing the tablets 70 of gas generating material. The canister 72 has a cylindrical side wall 74, a first end wall 76, and a second end wall 78, each of which is centered on a longitudinal central axis 79. The side wall 74 and the first end wall 76 are contiguous portions of a single piece of thin sheet metal. The second end wall 78 is a separate piece of thin sheet metal, and is preferably made of the same material as the side wall 74 and the first end wall 76. An 1100 series aluminum sheet material is most preferable.

The first end wall 76 of the canister 72 has a cup-like configuration. Specifically, an annular peripheral portion 80 of the first end wall 76 extends radially inward from the side wall 74. A circular central portion 84 of the first end wall 76 extends diametrically across the axis 79 at a location spaced axially inward from the peripheral portion 80. A cylindrical intermediate portion 84 of the first end wall 76 extends axially from the peripheral portion 80 to the central portion 82.

A plurality of score lines 86 are formed in the central portion 82 of the first end wall 76. The score lines 86 define coextensive stress risers in the sheet metal of which the end wall 76 is formed. As shown in FIG. 7, the stress risers 86 are arranged in a cruciform pattern centered on the axis 79, and define adjacent sides of a corresponding plurality of petal-shaped sections 88 of the first end wall 76. The petal-shaped sections 88 are separable and deflectable pivotally away from each other upon rupturing of the sheet metal along the stress risers 86. Although this is the preferred structure for the rupturable central portion 82 of the first end wall 76, any other suitable arrangement of one or more stress risers, or other weakened regions of the sheet material, could be used as an alternative.

The second end wall 78 of the canister 72 also has a circular central portion 90 extending diametrically across the axis 79. The central portion 90 of the second end wall 78 has a plurality of score lines 92 defining stress risers which, like the stress risers 86 described above, delineate a corresponding plurality of petal-shaped sections 94 of the second end wall 78 which are separable and deflectable pivotally away from each other upon rupturing of the central portion 90 along the stress risers 92. The number and arrangement of stress risers at the second end wall 78 also could differ. For example, an annular stress riser could define the periphery of a break-away part of the central portion 90 of the second end wall 78. However, a cruciform pattern of stress risers is most preferable.

A thin disk 100 of auto-ignition material (FIG. 5) is first placed in the combustion chamber 73. The auto-ignition material also may have any suitable composition known in the art. The tablets 70 of gas generating material are then inserted in the combustion chamber 73 through an open end 102 (FIG. 6) of the side wall 74. The tablets 70 are oriented randomly relative to each other in the combustion chamber 73. A sufficient number of tablets 70 are provided substantially to fill the combustion chamber 73 between the disk 100 and the open end 102 of the side wall 74.

A retention plate 110 and a spring 112 (shown schematically in FIG. 5) are next placed in the combustion chamber 73. The retention plate 110 is a thin metal disk with a large number of perforations 114 (FIG. 9) for the passage of inflation gas. The spring 112 may comprise a coil spring, wave spring, belleville spring, or the like.

Figure 9:
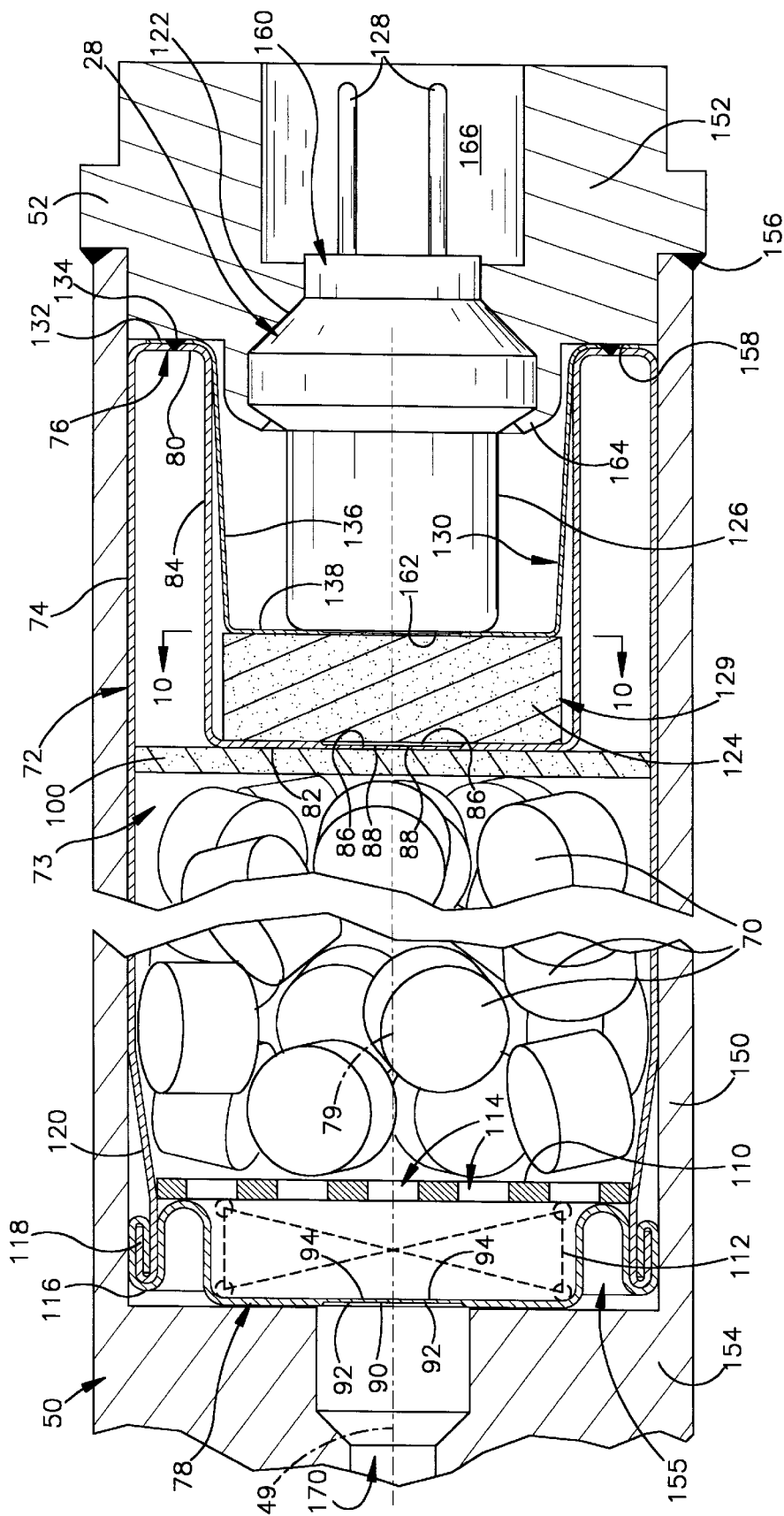
FIG. 9 is an enlarged partial view of parts shown in FIG. 5.

When the disk 100, the tablets 70, the retention plate 110, and the spring 112 have been placed in the combustion chamber 73, the second end wall 78 of the canister 72 is placed over the open end 102 of the side wall 74, as best shown in FIG. 9. An annular peripheral portion 116 of the second end wall 78 is then crimped together with an adjacent end portion 118 of the side wall 74. The crimped portions 116 and 118 of the end wall 78 and the side wall 74 interlock the end wall 78 with the side wall 74 to close the combustion chamber 73, and are crimped together tightly enough to seal the combustion chamber 73 hermetically. A short section 120 of the side wall 74 is tapered radially inward beside the crimped portion 116 to accommodate the combined radial thicknesses of the two crimped portions 116 and 118.

The spring 112 becomes compressed axially between the second end wall 78 and the retention plate 110 when the second end wall 78 is installed over the open end 102 of the side wall 74 to close the combustion chamber 73. An axially compressive load is then transmitted through the retention plate 110 from the spring 112 to the tablets 70 of gas generating material to keep the tablets 70 from rattling in the combustion chamber 73.

As shown in FIGS. 5 and 9, the initiator assembly 28 in the preferred embodiment of the present invention includes an igniter 122 and a booster charge 124. The igniter 122 is an electrically actuatable device which is known as a squib. The igniter 122 thus has a generally cylindrical casing 126 and a pair of axially projecting electrodes 128. The casing 126 contains a small charge of pyrotechnic material (not shown) which is ignited in a known manner upon the passage of electric current through the igniter 122 between the electrodes 128. The booster charge 124 is a short cylindrical piece of pyrotechnic material such as, for example, $BKNO_3$, and is contained in a hermetically sealed combustion chamber 129 which is located outside the canister 72. The chamber 129 is defined between the first end wall 76 of the canister 72 and a booster cover 130 which is mounted on the first end wall 76.

The booster cover 130 has a cup-like configuration, and is nested within the first end wall 76 of the canister 72. Specifically, an annular peripheral portion 132 (FIG. 9) of the booster cover 130 abuts the peripheral portion 80 of the first end wall 76 of the canister 72, and is fixed to the first end wall 76 by a circumferentially extending weld 134. The weld 134, which preferably is an ultrasonic weld, seals the chamber 129 hermetically. A tapered cylindrical portion 136 of the booster cover 130 projects axially and radially inward from the peripheral portion 132. A circular central portion 138 of the booster cover 130 extends diametrically across the axis 79 at the inner end of the cylindrical portion 136.

The central portion 138 of the booster cover 130 holds the booster charge 124 against the central portion 82 of the first end wall 76. As shown in FIG. 10, the central portion 138 of the booster cover 130 also has a cruciform pattern of intersecting stress risers 140. The stress risers 140 delineate a corresponding pattern of petal-shaped sections 142 of the central portion 138.

The booster cover 130 is defined by a single piece of thin sheet material. The thin sheet material of the booster cover 130 preferably is an 1100 or 3003 series aluminum material. A thin polypropylene or other plastic sheet material could be used as an alternative. If a thin aluminum sheet material is used, it is preferred to be substantially thinner than the sheet metal of which the canister 72 is formed, and is most preferably not more than about half as thick. A thinner material for the booster cover 130 facilitates formation of the ultrasonic weld 134 through preferential heating of that material.

The rigid metal housing 50 (FIG. 5) has an elongated cylindrical side wall 150, a first circular end wall 152, and a second circular end wall 154. The walls 150–154 of the housing 50 together define an elongated cylindrical storage chamber 155 in which the canister 72 (with the booster charge 124 and booster cover 130 attached) is received.

The first end wall 152 of the housing 50 is fixed to the side wall 150 by a circumferentially extending weld 156. An annular inner surface 158 (FIG. 9) of the first end wall 152 abuts the peripheral portion 132 of the booster cover 130. The igniter 122 extends through a central passage 160 in the first end wall 152, and projects axially from the first end wall 152 into the storage chamber 155. An inner end wall 162 of the casing 126 abuts the central portion 138 of the booster cover 130 at the petal-shaped sections 142. A crimped annular rim 164 at the inner side of the first end wall 152 retains the igniter 122 in place. The electrodes 128 are accessible in a cylindrical cavity 166 at the outer side of the first end wall 152.

The side wall 150 is an imperforate part of the housing 50 which surrounds the canister 72 fully throughout the length and circumference of the canister 72. Moreover, except in the vicinity of the tapered section 120, the side wall 150 of the housing 50 adjoins the side wall 74 of the canister 72 fully throughout the length and circumference of the side wall 74. The side wall 150 of the housing 50 also surrounds and adjoins the crimped-together portions 116 and 118 of the canister 72.

The second end wall 154 of the housing 50 defines an inflation fluid outlet passage 170 centered on the axis 49. The passage 170 is open at its opposite ends, and is the only inflation fluid outlet passage extending outward from the storage chamber 155. The second end wall 78 of the canister 72 abuts the second end wall 154 of the housing 50. The rupturable central portion 90 of the second end wall 78 extends across the inner end of the passage 170. The manifold 30 defines a cylindrical plenum 180 communicating the outer end of the passage 170 with the outlet openings 32. A tubular filter 182 (shown schematically) is contained in the plenum 180. The filter 182 has a structure which is well known in the art.

When the initiator assembly 28 is actuated, as described above with reference to FIGS. 1–3, the pyrotechnic material in the casing 126 is ignited and produces combustion products including heat and hot particles. These combustion products rupture the end wall 162 of the casing 126, and also rupture the adjoining central portion 138 of the booster cover 130. The stress risers 140 facilitate rupturing of the central portion 138 so that the combustion products emerging from the casing 126 move rapidly into the combustion chamber 129 to ignite the booster charge 124. Additional combustion products are then produced by the booster charge 124. Those combustion products rupture the central portion 82 of the first end wall 76, and are projected axially into the combustion chamber 73 to ignite the disk 100 and the tablets 70.

Ignition of the tablets 70 propagates rapidly throughout the combustion chamber 73. The resulting generation of inflation gas causes the fluid pressure in the combustion chamber 73 to increase rapidly toward greatly elevated levels. Since the side wall 150 of the housing 50 surrounds and adjoins the side wall 74 of the canister 72, as described above, the side wall 150 constrains the canister 72 from deflecting radially out of its cylindrical configuration under the influence of the increasing fluid pressure forces acting radially outward against the canister 72. When the fluid pressure reaches a predetermined elevated level, it ruptures the second end wall 78 of the canister 72 along the stress risers 92 at the central portion 90 of the second end wall 78. The inflation gas then flows outward from the canister 72 through the passage 170. The filter 182 removes particulate combustion products from the gas, and also cools the gas, as the gas flows further outward through the plenum 180 toward the outlet openings 32.

In accordance with a particular feature of the present invention, the cruciform pattern of stress risers 92 enables the petal-shaped sections 94 of the second end wall 78 to separate and deflect pivotally away from each other in a controlled manner upon rupturing of the stress risers 92, as noted above. This controlled rupturing of the end wall 78 helps to ensure that the petal-shaped sections 94, or other parts of the end wall 78, do not become severed from the end wall 78 and carried into the passage 170 by the inflation gas emerging from the combustion chamber 73. The petal-shaped sections 94 are then consumed by the heat of combustion without obstructing the outlet flow of inflation gas. The stress risers 86 at the first end wall 76 of the canister 72, as well as the stress risers 140 at the central portion 138 of the booster cover 130, similarly contribute to this feature of the present invention. Additionally, the retainer plate 110 helps to block any severed portions of the end wall 76, the booster cover 130, and/or the igniter casing 126 from reaching the passage 170.

From the above description of the invention, those skilled in the art will perceive improvements, changes and modifications. Such improvements, changes and modifications within the skill the of the art are intended to be covered by the appended claims.

Having described the invention, the following is claimed:

1. Apparatus comprising:

an inflatable vehicle occupant protection device;

a housing defining a storage chamber containing a canister, said housing having an end wall defining a solitary inflation fluid outlet passage extending outward from said storage chamber;

said housing being a rigid metal housing containing said canister, said housing having an imperforate cylindrical side wall surrounding said canister fully throughout the length and circumference of said canister;

said canister defining a hermetically sealed combustion chamber, said canister having a cylindrical configuration with a longitudinal central axis, a cylindrical side wall engaging said housing, and first and second opposite end walls, each of said end walls having a predetermined rupturable portion extending across said axis, said second end wall abutting said end wall of said housing;

a source of inflation fluid comprising a body of ignitable gas generating material contained in said combustion chamber, said body of ignitable gas generating material, when ignited, producing sufficient inflation fluid to inflate said inflatable vehicle occupant protection device; and an initiator assembly which is located outside said canister and which, when actuated, ruptures said rupturable portion of said first end wall and projects pyrotechnic combustion products into said combustion chamber along said axis to ignite said body of gas generating material in said combustion chamber;

said rupturable portion of said second end wall being rupturable under a predetermined inflation fluid pressure force acting outward from said combustion chamber.

2. Apparatus as defined in claim 1 wherein said rupturable portions of said end walls have stress risers defining adjacent sides of petal-shaped sections of said end walls.

3. Apparatus as defined in claim 1 wherein said housing is a rigid metal housing containing said canister, said housing having an imperforate cylindrical side wall surrounding said canister fully throughout the length and circumference of said canister.

4. Apparatus as defined in claim 3 wherein said canister has a cylindrical side wall which extends longitudinally between said end walls, said side wall of said housing adjoining said side wall of said canister to constrain said canister from deflecting out of said cylindrical configuration under the influence of inflation fluid pressure forces acting outward from said combustion chamber.

5. Apparatus as defined in claim 3 wherein said housing defines a storage chamber containing said canister, said housing having an end wall defining a solitary inflation fluid outlet passage extending outward from said storage chamber.

6. Apparatus comprising:

a canister defining a hermetically sealed combustion chamber, said canister having a cylindrical configuration with a longitudinal central axis and first and second opposite end walls, each of said end walls having a predetermined rupturable portion extending across said axis;

a source of inflation fluid comprising a body of ignitable gas generating material contained in said combustion chamber;

an initiator assembly which is located outside said canister and which, when actuated, ruptures said rupturable portion of said first end wall and projects pyrotechnic combustion products into said combustion chamber along said axis to ignite said body of gas generating material in said combustion chamber;

said rupturable portion of said second end wall being rupturable under a predetermined inflation fluid pressure force acting outward from said combustion chamber;

a rigid metal housing containing said canister, said housing having an imperforate cylindrical side wall surrounding said canister fully throughout the length and circumference of said canister;

said housing defining a storage chamber containing said canister, said housing having an end wall defining a solitary inflation fluid outlet passage extending outward from said storage chamber; and a manifold having a plurality of inflation fluid outlet openings, said manifold defining a plenum extending from said outlet passage to said outlet openings.

7. Apparatus as defined in claim 6 wherein said outlet passage is open fully from said storage chamber to said plenum prior to actuation of said initiator assembly.

8. Apparatus as defined in claim 6 wherein said end wall defines said outlet passage at a location centered on said axis.

9. Apparatus as defined in claim 8 wherein said second end wall of said canister abuts said end wall of said housing and extends across said outlet passage.

* * * * *